Patented Sept. 13, 1932

1,876,755

UNITED STATES PATENT OFFICE

WILLIAM F. RICHTER, OF APOLLO, PENNSYLVANIA, ASSIGNOR TO CHEMICAL HOLDING CORPORATION, OF APOLLO, PENNSYLVANIA, A CORPORATION OF DELAWARE

PROCESS OF PREPARING VISCOSE

No Drawing.   Application filed May 1, 1931. Serial No. 534,447.

This invention relates to the viscose process for the production of artificial silk and similar products.

A major disadvantage of the viscose process as practiced hitherto has been the great length of time required in the preparation of viscose for spinning. For instance, it has been necessary to age both alkali cellulose and the viscose solution formed therefrom for extended periods requiring, on an average from six to eight days. Such prolonged processing requires large amounts of storage space, and rather accurate temperature control is necessary during the entire period, so that overhead costs are high. However, it has not been found possible up to the present time commercially to produce satisfactory viscose products without these aging operations.

The major objects of this invention are to minimize the time necessary for the preparation of viscose for spinning, and to produce satisfactory products from unaged, or unmatured, viscose.

The invention is predicated upon my discovery that satisfactory viscose products may be made by preparing viscose from unaged alkali cellulose having a slight degree of hydration at a temperature not exceeding about 10° C., and while maintaining the solution at that temperature, immediately preparing it for spinning, and without substantial aging spinning it in a coagulating bath maintained at a temperature below about 10° C. The product prepared from viscose in this manner is less glossy than artificial silk made from aged viscose prepared in the usual manner, but it possesses substantially greater strength. In this manner the prolonged aging operations are eliminated.

In the practice of this invention alkali cellulose is made from a form of suitable cellulose by steeping in caustic soda solution in the usual manner. The excess alkali is then pressed out from the treated cellulose until the residue contains about three parts of sodium hydroxide per part of cellulose, calculated on the weight of dry cellulose.

The alkali cellulose is shredded at once. This step is preferably conducted in the manner described in my copending application Serial No. 374,275, filed June 27, 1929, according to which shredding is effected by periodically reversing the direction of rotation of the shredding element. For the purposes of this invention the rotating shredder element may be rotated for three minutes in one direction, and one minute in the reverse direction, these cycles being repeated continuously during two hours, when shredding will be complete.

In accordance with this invention, alkali cellulose of a relatively low degree of hydration is used. To this end the customary aging, which effects hydration, is dispensed with, and the crumbs are xanthated immediately after shredding. Preferably this is completed in not over about three hours, during which time the temperature gradually rises from about 18° C. to 35° C. When xanthating is complete the excess vapors of carbon disulfide are drawn off, and the xanthate is transferred to a mixer for dilution with sodium hydroxide to form viscose solution.

In the preferred embodiment of this invention the sodium hydroxide solution is kept at a constant temperature of 8° C., and while the temperature may vary somewhat, it should not exceed about 10° C. Mixing is continued until homogeneous viscose is obtained, which usually is about five hours, the temperature being held constant during this time. When mixing is complete the solution is prepared in the customary manner for spinning. For example, it may be filtered three times, and then transferred to a container for elimination of gas bubbles, after which the viscose is spun. In order to obtain the best results, the viscose should be spun in about eight hours after mixing, and the temperature is to be maintained constant at about 8° C.

The spinning bath is also maintained at a constant temperature preferably of 8° C., and not over about 10° C. I have found that a characteristic of the unaged viscose produced by my invention is that satisfactory coagulation requires an extended exposure in the bath of the filament, or other shape into which the viscose is spun. The period of exposure required to effect suitable coagulation is substantially greater than that commonly used in the spinning of aged viscose. I have found also that my viscose may be coagulated satisfactorily in simple baths of mineral acids, as distinguished from the acid baths containing dissolved salts which have been used heretofore. For instance, in using an 18 percent solution of sulfuric acid artificial silk of satisfactory quality is produced by my invention by passing the filaments through at least 14 inches of solution.

Products produced in accordance with my invention are then subjected to the usual curing operations. For example, artificial silk may be collected on the hollow perforated drums of large diameter, and washed and cured thereon by passing a suitable liquid outwardly from inside the drum under the pressure due to its gravity head alone, as disclosed and claimed in my copending application Serial No. 505,749, filed December 31, 1930.

As an example of the practice of the invention, 10 pounds of dry cellulose, for example a wood pulp suitable for the manufacture of viscose by the older processes, is steeped in an 18 percent solution of NaOH at about 18° C. for about 30 minutes. The treated cellulose is then pressed and shredded in the preferred manner described hereinabove, while keeping the alkali cellulose at about 18° C. The crumbs are then xanthated at once, using about 30 percent of $CS_2$. This operation requires about 3 hours. After the excess $CS_2$ has been drawn off, the xanthate is transferred to a mixer and treated with a 4.5 percent solution of NaOH kept at a constant temperature of 8° C., sufficient solution being used to form a viscose containing about 3 percent of cellulose. After mixing is complete, which requires about 5 hours, the viscose is filtered in the customary manner, and is held at 8° C. to permit liberation of occluded gases. It is then spun through at least 14 inches of an 18 percent $H_2SO_4$ solution held at 8° C.

Products prepared from viscose made and spun in the manner described hereinabove are of satisfactory quality. A particular feature of such products is that they are less glossy than the materials normally produced from aged viscose. This is a present desideratum whose attainment has thus far been dependent upon the use of materials added to the viscose or to the setting bath for this purpose. This has increased the cost of the products, it has not been wholly satisfactory, because some of the low luster materials resulting from those processes exhibit a tendency to become lustrous upon being used and washed repeatedly.

The invention thus provides a process of preparing viscose products in which the material may be prepared and spun in a single day, as compared with eight or nine days in previous processes. The advantages of such a saving in processing time, particularly from practical and economical aspects, will be understood by those skilled in the art.

According to the provisions of the patent statutes, I have explained the principle of my invention and have described what I now consider to represent its best embodiment. However, I desire to have it understood that, within the scope of the appended claims, the invention may be practiced otherwise than as specifically described.

I claim:

1. In a process of making viscose products the steps comprising xanthating unaged alkali cellulose, dissolving the xanthate in dilute caustic soda solution at about 8° C., maintaining the viscose solution at said temperature and without substantial aging, spinning it in an 18 per cent solution of sulfuric acid at said temperature and for a time to cause coagulation.

2. In a process of making viscose products the steps comprising xanthating unaged alkali cellulose, dissolving the xanthate in dilute caustic soda solution at about 8° C., and while maintaining the viscose solution at said temperature and without substantial aging spinning it in an 18 per cent aqueous solution of sulfuric acid, the thus spun material passing through at least fourteen inches of said bath.

3. In a process of making viscose products the steps comprising xanthating unaged alkali cellulose, dissolving said xanthate in dilute caustic soda solution at about 8° C. to form a viscose solution having a cellulose concentration of about 3 per cent, preparing said viscose solution for spinning during a period not exceeding about eight hours while maintaining it at about 8° C., and immediately forming products therefrom by coagulation in an 18 per cent solution of sulfuric acid at about 8° C., and passing the material through at least fourteen inches of said acid solution.

4. A process of making viscose products comprising steeping cellulose in an 18 per cent solution of sodium hydroxide for about thirty minutes, removing excess sodium hydroxide, shredding the alkali cellulose, xanthating at once, forming viscose solution from said xanthate by treatment with dilute sodium hydroxide at about 8° C., and without substantial aging, spinning the viscose at 8° C. in an 18 per cent solution of sulfuric acid through a length of bath sufficient to effect coagulation.

5. A process of making viscose products comprising steeping cellulose in an 18 per cent solution of sodium hydroxide for about thirty minutes, removing excess sodium hydroxide, shredding the alkali cellulose, xanthating at once, forming viscose solution containing about 3 per cent of cellulose from said xanthate by treatment with dilute sodium hydroxide at about 8° C., and without substantial aging spinning in an 18 per cent solution of sulfuric acid at 8° C. while exposing the spun material to a length of said solution sufficient to effect coagulation.

6. A process of making viscose products comprising treating cellulose with an 18 per cent solution of sodium hydroxide for thirty minutes to form alkali cellulose, removing the excess sodium hydroxide to provide alkali cellulose containing about three parts of sodium hydroxide per part of cellulose, shredding during a period not exceeding about two hours, xanthating the shredded alkali cellulose without aging it, diluting said xanthate with dilute sodium hydroxide solution at about 8° C. to form a viscose solution containing about 3 percent cellulose, preparing said viscose for spinning during a period not exceeding about eight hours while maintaining it at about 8° C., and immediately spinning through a length of an 18 per cent solution of sulfuric acid sufficient to effect coagulation, said bath being maintained at 8° C.

In testimony whereof, I sign my name.

WILLIAM F. RICHTER.